United States Patent [19]

Zahn

[11] 4,429,456

[45] Feb. 7, 1984

[54] APPARATUS FOR INSERTING ELEMENTS INTO A WORKPIECE

[76] Inventor: Irwin Zahn, 300 E. 33rd St., New York, N.Y. 10016

[21] Appl. No.: 344,623

[22] Filed: Feb. 1, 1982

[51] Int. Cl.[3] ...................... B23P 19/00; A43D 69/12; B27F 7/00

[52] U.S. Cl. ........................................ 29/798; 29/837; 29/739; 227/94; 227/95

[58] Field of Search ................. 29/739, 798, 837, 413, 29/414, 244; 227/94, 95, 115, 116

[56] References Cited

U.S. PATENT DOCUMENTS 3,739,446 6/1973 Long, Jr. et al. ..................... 227/94
4,176,448 12/1979 Zahn et al. ............................ 29/739
4,205,772 6/1980 Liepold et al. ....................... 227/95
4,265,013 5/1981 Brown et al. ....................... 227/116

*Primary Examiner*—Howard N. Goldberg
*Assistant Examiner*—Steven Nichols
*Attorney, Agent, or Firm*—Lerner, David, Littenberg, Krumholz & Mentlik

[57] ABSTRACT

An apparatus is disclosed for inserting elements into a workpiece. The apparatus includes reciprocating feeding means movable between first and second positions for sequentially advancing a supply strip of integrally connected preformed elements towards the workpiece. Actuating means cooperate with the reciprocating feeding means for rotating the reciprocating feeding means when the reciprocating feeding means has reached its second position. During the rotation, the supply strip of elements rotates with respect to the lead element which has been inserted into the workpiece thereby breaking the lead element from the supply strip. As the feeding means, holding the supply strip, rotates back to its initial position, the interaction of the supply strip and the lead element which has been inserted into the workpiece polishes and wipes away any burr that may have remained during the severance. The supply strip may comprise a plurality of integrally connected preformed terminal pins which may be utilized in the electrical and electronics industry after insertion into a substrate such as a printed circuit board, but other supply strips of integrally connected preformed elements may be utilized for application in non-electrical industries.

11 Claims, 10 Drawing Figures

APPARATUS FOR INSERTING ELEMENTS INTO A WORKPIECE

FIELD OF THE INVENTION

This invention relates to a method and apparatus for inserting elements into a workpiece, more particularly, to such an apparatus which operates from a continuous supply strip of integrally connected preformed elements and, more particularly, to such an apparatus which inserts the elements in such a manner that the lead element is severed from the remainder of the supply strip during relative rotation therebetween.

BACKGROUND OF THE INVENTION

In the fabrication of many electrical products it is frequently necessary to establish a plurality of upstanding terminal pins on a substrate. For example, on printed circuit boards, it is necessary to establish terminal points to which external wiring can be secured. Likewise, in many non-electrical applications, it is necessary to insert preformed elements into a given substrate. In U.S. Pat. No. 4,176,448, assigned to the assignee of the present invention, there is disclosed a method and an apparatus for inserting terminal pins into a substrate such as a printed circuit board. The apparatus disclosed in said patent operates from a continuous supply strip of integrally connected preformed terminal pins which terminate at their opposite ends in pointed end portions thereby defining notches between the adjacent pins. The apparatus includes reciprocating feeding means for sequentially advancing the supply strip toward the workpiece, shearing means for severing the leading one of the pins from the remainder of the supply strip, and driving means for inserting the severed lead one of the pins into the workpiece.

SUMMARY OF THE INVENTION

While the apparatus, method, and supply strip disclosed in the aforementioned U.S. patent are excellent in their own right, the apparatus and method hereof, while also operating from a continuous supply of integrally connected preformed elements, has the additional advantage of effectively causing the severed lead element to be polished and cleaned with respect to the remainder of the supply strip so as to remove any burrs remaining after the severance.

More particularly, the apparatus of the instant invention includes reciprocating feeding means movable between first and second positions for sequentially advancing a supply strip of integrally connect preformed elements toward the workpiece into which the elements are to be inserted. The apparatus further includes actuating means cooperating with the reciprocating feeding means for rotating the reciprocating feeding means when the reciprocating feeding means as reached its second position. During the rotation, the lead element which has been inserted into the workpiece is rotated relative to the remainder of the supply strip to sever the lead element therefrom. During the reverse rotation of the feeding means, the severed ends of the lead element and the remainder of the supply strip effectively polish each other and wipe away any burrs that may have remained.

Preferably, the actuating means also moves the reciprocating feeding means between its first and second position, and in its preferred form, the activating means comprises an over-center linkage assembly having a first end connected to the drive shaft of the apparatus for rotation therewith, and a second end operatively connected to the reciprocating feeding means for moving it between its first and second position in response to an initial period of rotation of the drive shaft.

The reciprocating feeding means includes an outstanding projection, and the over-center linkage engages the projection to cause rotation of the reciprocating feeding means during a second period of rotation of the drive shaft to thereby effect severance of the lead element from the remainder of the supply strip.

The feeding means includes pivoting feed fingers one end of which are biased toward engagement with the supply strip with the fingers positioned to grasp and advance the supply strip at the juncture of adjacent integrally connected preformed elements. On the return, upward stroke the fingers are free to slide relative to the supply strip which at that point in time is held stationary by an anti-reverse checking cam which also co-acts with the notched regions in the supply strip formed by the integrally connected preformed elements. The reciprocating feeding means is longitudinally movable relative to the anti-reverse motion camming means as the reciprocating feeding means moves between its first and second position but is keyed for rotation therewith.

Accordingly, it is an object of the instant invention to provide apparatus for inserting elements into a workpiece, said apparatus comprising reciprocating feeding means movable between first and second positions for sequentially advancing a supply strip of integrally connected preformed elements toward said workpiece, and actuating means cooperating with said reciprocating feeding means for rotating said reciprocating feeding means when said reciprocating feeding means has reached its said second position.

Another object of the instant invention is to provide a method for inserting elements into a workpiece, said method comprising the steps of sequentially advancing a supply strip of integrally connected preformed elements toward said workpiece until the lead one of said elements enters said workpiece, and rotating said supply strip with respect to the lead one of said elements.

Still another object of the instant invention is to provide such an apparatus which includes a drive shaft and wherein said activating means comprises an over center linkage assembly having a first end connected to the drive shaft for rotation therewith and a second end operatively connected to a reciprocating feeding means for moving the reciprocating feeding means to its second position in response to an initial period of rotation of the drive shaft.

Still another object of the instant invention is to provide such an apparatus wherein the reciprocating feeding means includes an outstanding projection, and wherein said over center linkage assemble engages said projection to cause rotation of said reciprocating feeding means during a second period of rotation of said drive shaft during which time the lead one of the elements of said supply strip is severed from the remainder thereof.

These and other objects of the instant invention will be further understood by referring to the specification and the following drawings.

DETAILED DESCRIPTION

Figure 1:
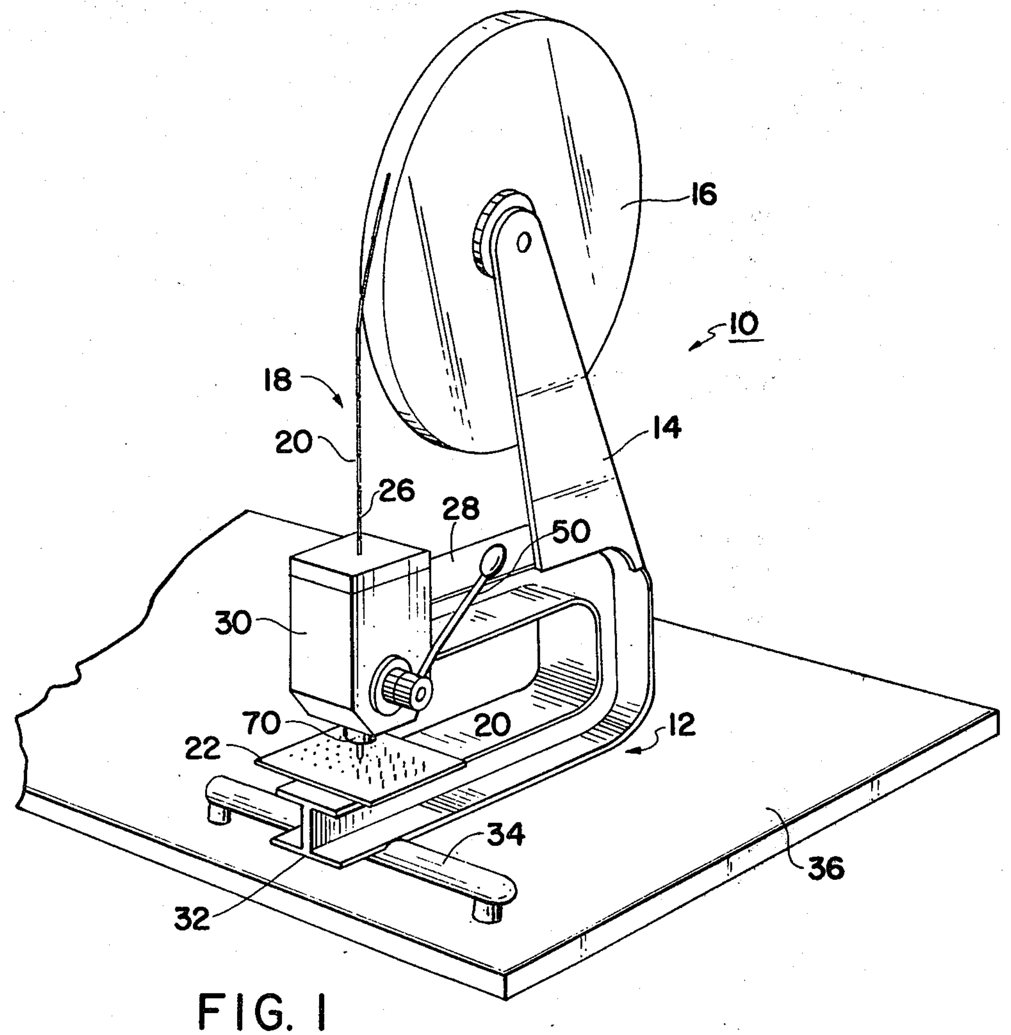
FIG. 1 is a perspective view of the apparatus of the instant invention.
Figure 2:
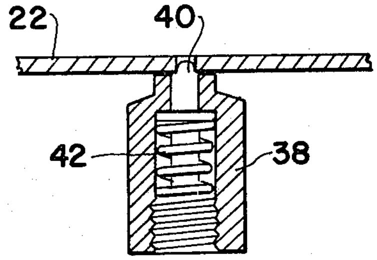
FIG. 2 is an enlarged view, partly in section, illustrating centering mechanism utilized in the apparatus of FIG. 1.

Turning to the drawings, wherein like numerals are used to designate like elements, the apparatus 10 of the instant invention is seen to include a generally U-shaped frame 12 upstanding from which is a support arm 14 which carries a reel 16 on which is coiled the endless supply strip 18 of integrally connected preformed elements 20 which are to be inserted in the substrate 22. In the embodiment of FIG. 1, the supply strip 18 is formed of integrally connected preformed terminal pins of square cross-section which terminate at opposite ends in pointed regions which cooperate to thereby define notches 26 therebetween. If desired, however, supply strip 18 may take other forms, for example, a plurality of integrally connected preformed elements such as lugs.

Secured to the U-shaped frame 12 at one end 28 thereof is the head 30 of the apparatus, to be described in greater detail, by means of which the preformed elements 20 may be inserted into the substrate 22. Positioned beneath the other end 32 of the U-shaped member 12 is a crossbar 34 which aids in supporting the entire apparatus 10 on a work surface such as a tabletop 36. Also located on the other end 32 of the U-shaped frame 12, but positioned beneath the substrate 22 so as not to be visible in FIG. 1, is a locating mechanism 38 including a plunger 40 which is biased upwardly by a spring 42 to properly locate the apertures in the substrate 22 beneath the head 30 of the apparatus. In this manner, when the supply strip is sequentially advanced, in a manner to be further described, the lead element 20 thereof will properly enter an aperture in the substrate.

Figure 5:
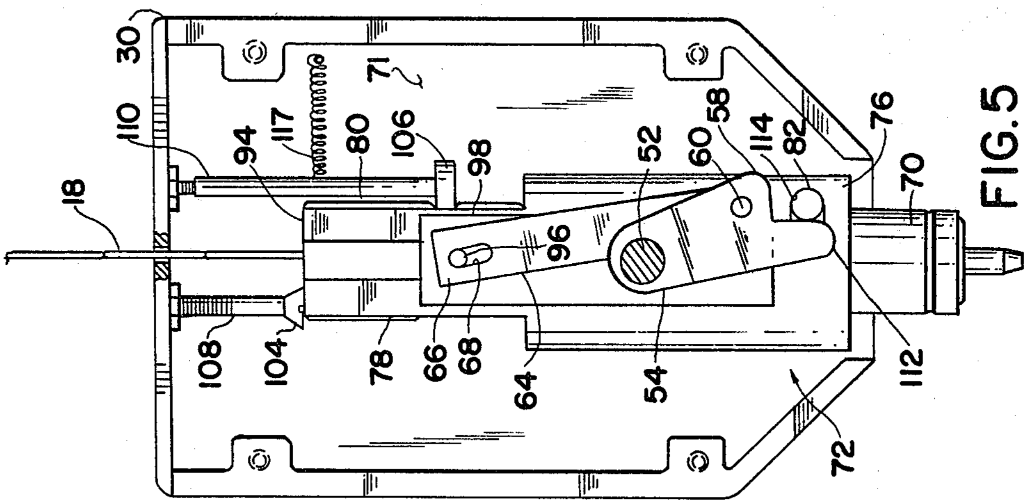
FIG. 5 is a front elevation of a portion of the machine illustrated in FIG. 1 with cover removed, similar to the view shown in FIGS. 3 and 4, but illustrating the parts thereof in a different position.
Figure 3:
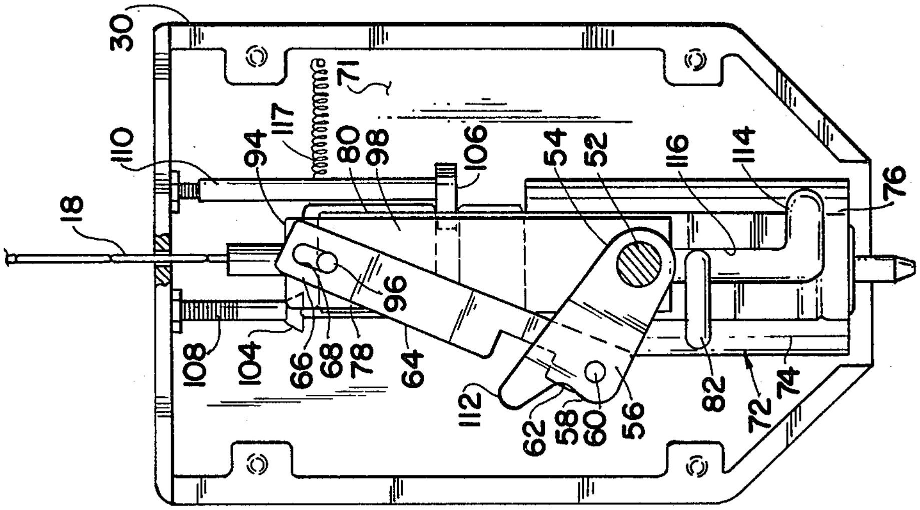
FIG. 3 is a front elevation of a portion of the machine illustrated in FIG. 1, with cover removed, to illustrate the inner workings thereof.
Figure 6:
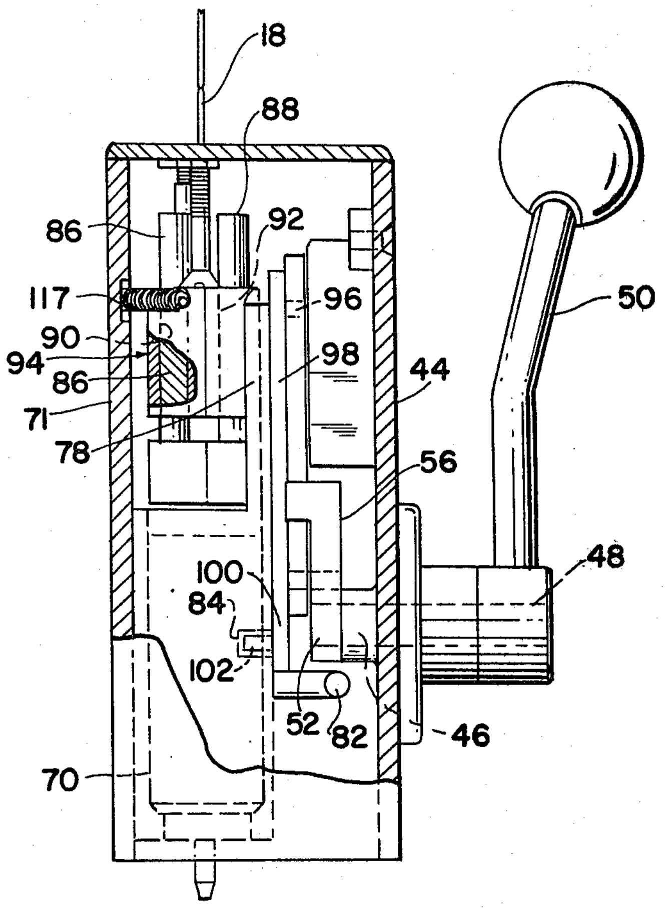
FIG. 6 is a side elevation view of a portion of the apparatus shown in FIG. 1.

Turning to FIG. 3, the head 30 is illustrated with the cover 44 removed therefrom. As best seen in FIG. 6, passing through the cover 44 is a drive shaft 46 to one end 48 of which is secured in operating handle 50. The opposite end 52 of the drive shaft 46 has keyed thereto for rotation therewith one end 54 of a link 56 the opposite end 58 of which is pinned by pivot pin 60 to one end 62 of link 64 the opposite end 66 of which has an elongated slot 68 therein. As will be explained in greater detail, the links 56 and 64 together comprise an over center linkage mechanism the purpose of which is to initially drive a feed mechanism 70 from the position shown in FIG. 3 to the position shown in FIG. 4 and thereafter to effectuate rotation of the feeding mechanism 70 from the position shown in FIG. 4 to the position shown in FIG. 5. As will be further explained, when the feeding mechanism 70 is driven from the position shown in FIG. 3 to FIG. 4, the lead element 20 of the supply strip is inserted into an aperture in the workpiece 22. Thereafter, when the feed mechanism 70 is rotated (while the substrate with the lead element therein is held stationary), the remainder of the supply strip 18 rotates with respect to the stationary lead element inserted in the substrate to cause severance therebetween.

More particularly, secured to the rear wall 71 of the head is a guide or trunnion 72 comprised of spaced apart semi-circular side portions 74 and 76 which include upstanding vertical wall portions 78 and 80 respectively. Slidably mounted in trunnion 72 is the reciprocating feeding member 70 to be described in greater detail. For present purposes, it is sufficient to note the feed member 70 includes an outstanding L-shaped projection 82, a groove 84 and a pair of upstanding guide pins 86 and 88 respectively which freely pass through elongated passageways 90 and 92 respectively in an anti-reverse motion camming block 94 to be described in greater detail.

Referring to FIG. 3, positioned in the elongated slot 68 in the link 64 is a pin 96 outstanding from a drive plate 98. The drive plate 98 is movable up and down in the channelway defined between the upstanding wall portions 78 and 80 which project upwardly from the semi-circular side portions 74 and 76 of the trunnion 72. The lower end 100 of the drive plate 98 carries an inwardly directed pin 102 which resides within the groove 84 provided in the feed block 70. It should be noted that the anti-reverse motion camming block 94 is normally prevented from experiencing vertical motion by being trapped between the heads 104 and 106 of two adjustment screws 108 and 110, respectively.

In operation, when the operator rotates the operating handle 50, it causes the link 56 to rotate counterclockwise as viewed in FIG. 3. With continued rotation of the link 56 the pin 60 pulls link 64 downwardly to the position illustrated in FIG. 4, during which time pin 96 and hence drive plate 98 are driven downwardly as well. As a consequence thereof the inwardly directed pin 102 residing in groove 84 of feed block 70 causes the feed block 70 to be driven from its first position shown in FIG. 3 to its lower most second position shown in FIG. 4. It will be appreciated that during the downward travel of the feed block 70, the anti-reverse motion cam block 94 remains trapped between the heads 104 and 106 of the adjustment screws 108 and 110 notwithstanding the fact that the guide pins 86 and 88 travel through the anti-reverse motion camming block 94 with the downward travel of the feed block 70.

Figure 4:
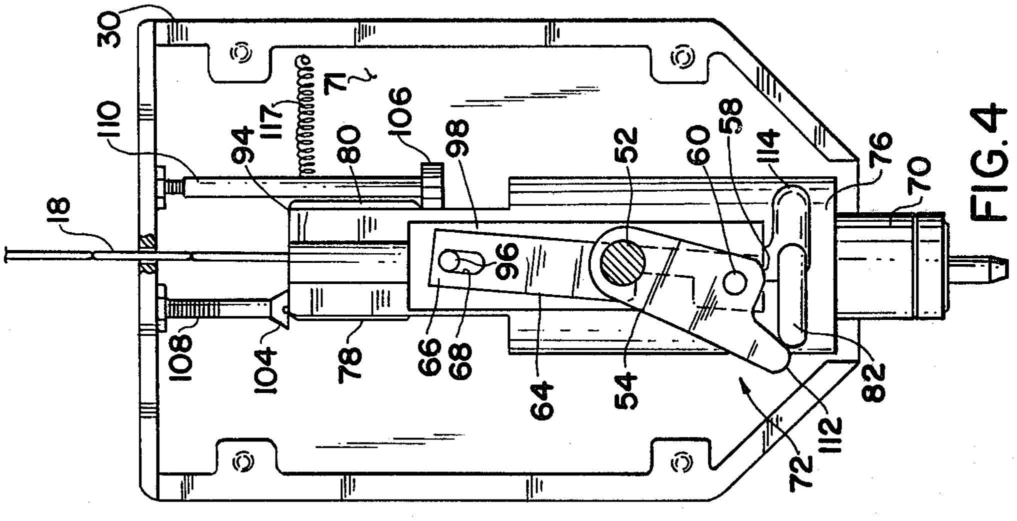
FIG. 4 is a front elevation of a portion of the machine illustrated in FIG. 1 with cover removed, similar to the view shown in FIG. 3, but illustrating the parts thereof in a different position.

Once the pin 60 joining links 56 and 64 reaches the center line position shown in FIG. 4, further rotation of the operating handle 50 and hence further rotation of the link 56 causes an extension 112 of link 56 to contact the L-shaped projection 82 which, with the downward travel of the feed block 70 has reached the lateral portion 114 of slot 116 provided in trunnion 72. Further rotation of the operating handle causes the extension 112 to rotate the projection 82 and hence the feed block 70 the position illustrated in FIG. 4 to the position illustrated in FIG. 5. During the rotation of the feed block 70 and because of the upstanding pins 86 and 88, the anti-reverse motion camming block 94 rotates therewith against the bias of a return spring 117 which becomes extended during the rotation.

When the operating handle 50 is released, the force generated by the return spring 117 rotates the anti-reverse motion camming block 94 and the feed block 70 back to the position illustrated in FIG. 4. Thereafter, further reverse motion of the operating handle 50 causes the link 56 to rotate clockwise as shown in FIG. 3 to lift the link 64 and hence lift the drive plate 98 whose inwardly directed pin 102 thereby lifts the feed block 70 back to its starting position. It should be noted that limits stops 146 and 148 provided on the inside of cover 44 define the limits of rotational travel of the link 56.

Figure 7:
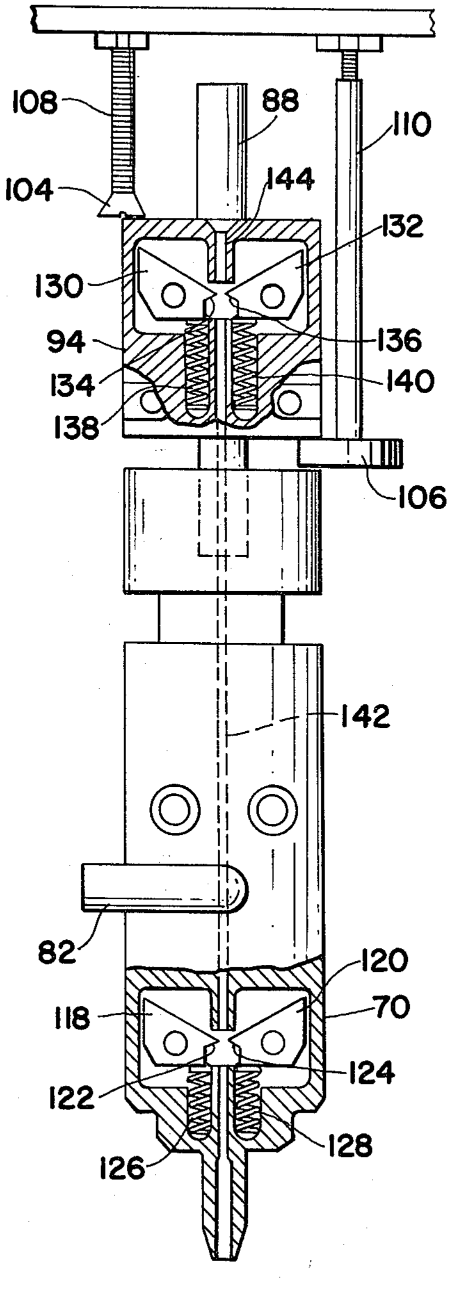
FIG. 7 is a view, partly in section, of a portion of the interior of a portion of the apparatus of FIG. 1.
Figure 9:
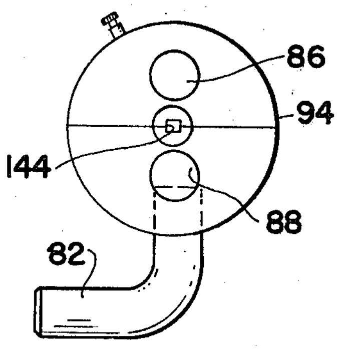
FIG. 9 is a top view of a portion of the machine illustrated in FIG. 7.
Figure 10:
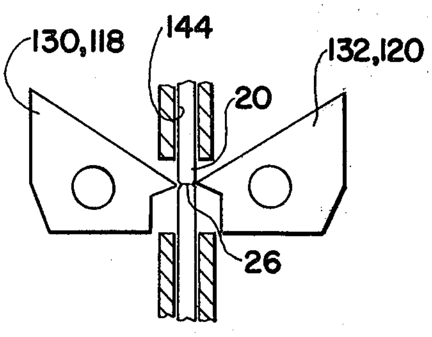
FIG. 10 is a front view, partly in section, of the machine illustrated in FIG. 7.
Figure 8:
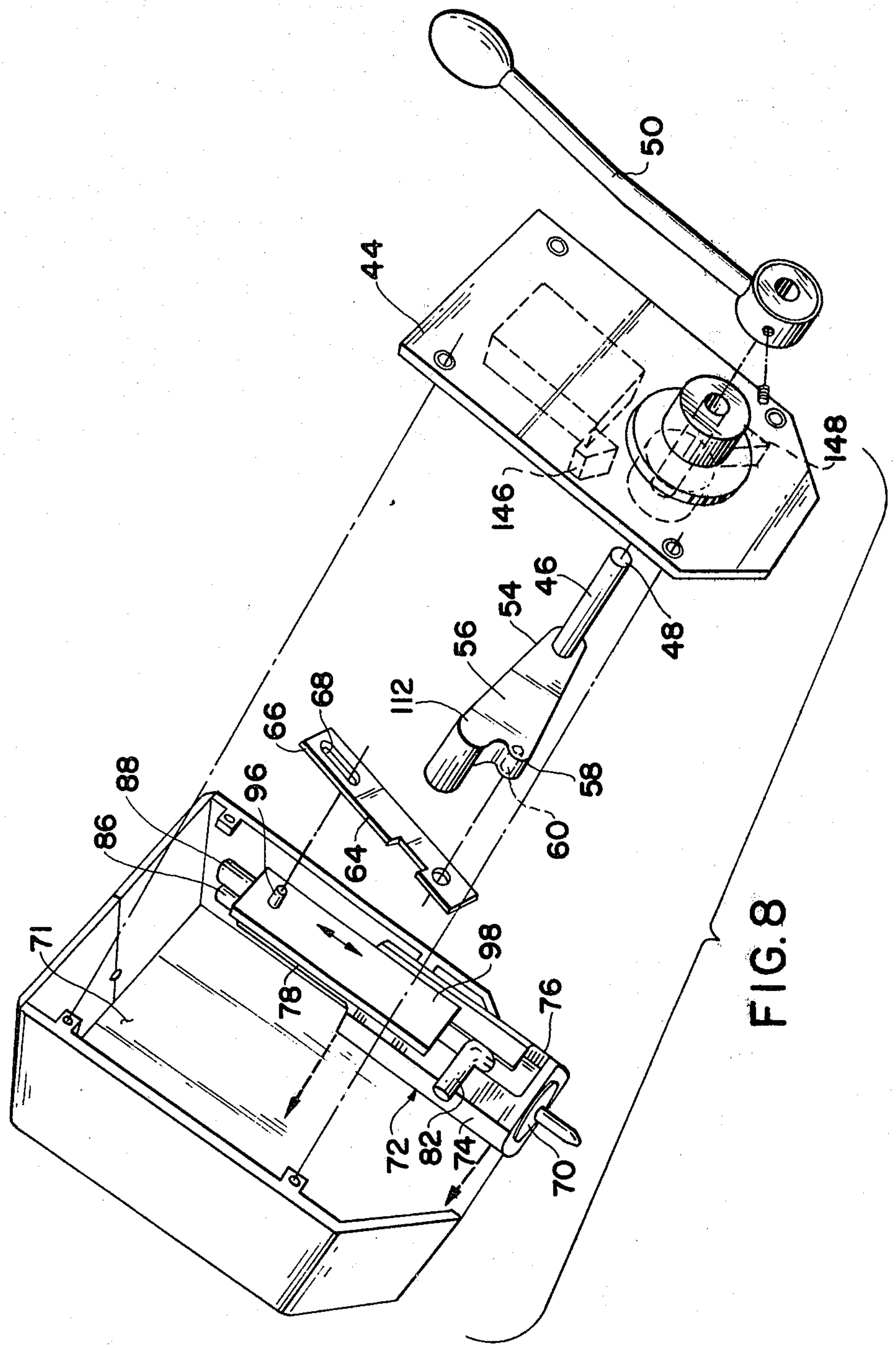
FIG. 8 is an exploded perspective view of a portion of the machine illustrated in FIG. 1.

Turning to FIG. 7, it will be seen that the feed block 70 includes therein a pair of pivoting fingers 118 and 120 one pointed end of which 122 and 124 respectively are biased into engagement with the supply strip 18 by springs 126 and 128, respectively. In like fashion, the anti-reverse motion cam block 94 includes a pair of pivoting fingers 130 and 132 respectively having pointed end portions 134 and 136 respectively biased into engagement with the supply strip 18 by springs 138 and 140, respectively. It should be noted also that passing through the feed block 70 is a guide tube 142 having the same internal cross-sectional configuration as the supply strip 18. Likewise, passing through the anti-reverse motion camming block 94 is a guide tube 144 having the same internal cross-section as the supply strip 18.

It will be appreciated that during the downward travel of the feed block 70, the ends 122 and 124 of the feed fingers 118 and 120 located in the notch 26 pull the supply strip downwardly to cause the lead one 20 of the elements 20 to be inserted into an aperture in the workpiece 22. During the rotational portion of the movement of the feed block 70 (and assuming the operator holds the substrate having the lead element 20 press fit therein), the rotation of the feed block 70 together with the rotation of the anti-reverse motion camming block 94 causes the remainder of the supply strip to rotate with respect to the stationary element 20 held in the substrate to thereby affect severance therebetween. During the reverse rotational motion of the feed block 70, the severed end portions of the elements polish one other and effectively remove any burr which might otherwise remain.

On the upward travel of the feed block 70, the feed fingers 118 and 120 merely slide up the supply strip 18 while the ends 134 and 136 of the reverse motion fingers 130 and 132 prevent the supply strip from any reverse motion.

It will be appreciated that the distance between the ends 134 and 136 of the fingers 130 and 132 and the ends 122 and 124 of the feed fingers 118 and 120 is an exact multiple of the length of the individual elements 20 of the supply strip. By rotating the adjustments screws 108 and 110, the anti-reverse motion camming block can be moved relative to the feed block 70 to vary the distance between the respective feed fingers, i.e., compensate for supply strips having elements of different lengths.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

What is claimed is:

1. Apparatus for inserting elements into a workpiece; said apparatus comprising:
   - reciprocating feeding means movable between first and second positions for sequentially advancing a supply strip of integrally connected preformed elements toward said workpiece; and
   - actuating means cooperating with said reciprocating feeding means for rotating said reciprocating feeding means when said reciprocating feeding means has reached its said second position.

2. The apparatus of claim 1 wherein said actuating means also moves said reciprocating feeding means between its first and second positions.

3. The apparatus of claim 2 and further including a drive shaft; and wherein said actuating means comprises an over-center linkage assembly having a first end connected to said drive shaft for rotation therewith and a second end operatively connected to said reciprocating feeding means for moving said reciprocating feeding means to its second position in response to an initial period of rotation of said drive shaft.

4. The apparatus of claim 3 wherein said reciprocating feeding means includes an outstanding projection, and wherein said over-center linkage assembly engages said projection to cause rotation of said reciprocating feeding means during a second period of rotation of said drive shaft.

5. The apparatus of claim 4 wherein said reciprocating feeding means includes a pivoting feed finger, one end of which is biased towards engagement with said supply strip, said one end positioned to permit relative motion of said feed finger with respect to said supply strip when said reciprocating feeding means is moving between its second and first position.

6. The apparatus of claim 5 and further including anti-reverse motion camming means for preventing reverse motion of said supply strip when said reciprocating feeding means is moving between its second and first positions.

7. The apparatus of claim 6 wherein said reciprocating feeding means is located a predetermined distance from said anti-reverse motion camming means when said reciprocating feed means is in its first position, said predetermined distance being a multiple of the length of said preformed elements.

8. The apparatus of claim 7 wherein said anti-reverse motion camming means is adjustably positioned relative to said reciprocating feeding means whereby said predetermined distance may be varied such that said apparatus may accommodate supply strips of integrally connected performed elements of different lengths.

9. The apparatus of claim 7 wherein said reciprocating feeding means is longitudinally movable relative to said anti-reverse motion camming means as said reciprocating feeding means moves between its first and second position but keyed for rotation therewith.

10. The apparatus of claim 6 wherein said reciprocating feeding means is longitudinally movable relative to said anti-reverse motion camming means as said reciprocating feeding means moves between its first and second position but keyed for rotation therewith.

11. The apparatus of claim 1 and further including anti-reverse motion camming means for preventing reserve motion of said supply strip when said reciprocating feeding means is moving between its second and first positions and wherein said reciprocating feeding means is longitudinally movable relative to said anti-reverse motion camming means as said reciprocating feeding means moves between its first and second position but keyed for rotation therewith.

* * * * *